Aug. 22, 1961 R. E. MATTESON 2,997,204
TIERED CHUTE DISPENSER
Filed May 14, 1959 3 Sheets-Sheet 2

INVENTOR
Russell E. Matteson

BY Karl W. Flocks
ATTORNEY

Aug. 22, 1961  R. E. MATTESON  2,997,204
TIERED CHUTE DISPENSER
Filed May 14, 1959  3 Sheets-Sheet 3

INVENTOR
Russell E. Matteson

BY Karl W. Flocks
ATTORNEY

United States Patent Office 2,997,204  
Patented Aug. 22, 1961

2,997,204  
TIERED CHUTE DISPENSER  
Russell E. Matteson, Morris, Ill., assignor to Diamond National Corporation, a corporation of Delaware  
Filed May 14, 1959, Ser. No. 813,209  
10 Claims. (Cl. 221—297)

The present invention relates to a tiered chute dispenser, and more particularly to such a dispenser having fingers axially spaced along each chute and alternately interposable therein to effect dispensing of crushable articles one at a time.

In the marketing of eggs, egg producers furnish egg rooms with eggs in bulk supply. At the egg rooms, the eggs are separated into different groups, by weight and grade, and are packed in cartons, such as one dozen cartons, each of the cartons containing only eggs of a particular size and grade. The processing of the eggs may be accomplished by either human workers or machines, or a combination of both, but in any event the eggs must be placed in such cartons for ultimate delivery to the consumer. As will be apparent, the cartons are similar in physical construction, but must be differently marked to indicate to the consumer the weight and grade of eggs contained therein. Thus, it is common to mark egg cartons by printing thereon such designations as "Medium Size—Grade A" or "Large Size—Grade AA."

In addition to the cartons printed differently because of the differing size and grade of eggs packed, it is often the case that a single egg room will process and package eggs for a number of different retail outlets, each of which has its own characteristic markings for the egg cartons which it handles. This, of course, compounds the number of differently printed egg cartons.

In view of the above, it may be seen that an egg room must store a considerable number of similar, but differently printed, cartons and must be provided with apparatus to furnish the variously printed cartons to the egg candling personnel or egg handling machinery.

While dispensers have been provided for various articles in the prior art, these dispensers have in general been constructed for such articles as tin cans, which have the common attribute of being cylindrical so that they may roll, and also rigid, so as to withstand forces exerted thereon by the dispensing mechanism. Where dispensers have been provided for other objects, they have usually been complicated in construction and consequently expensive to manufacture. Dispensers for such articles as egg cartons have not been automatic in operation, but in general have provided for hand withdrawal of the cartons by personnel in the egg room.

An object of the present invention is to provide an apparatus for holding and dispensing crushable, flexible articles.

Another object of the present invention is the provision of dispensing apparatus capable of storing large quantities of a plurality of articles similar in size and shape but differing in coloring, marking, or the like.

Another object of the present invention is to provide a dispensing apparatus that is readily adaptable to operation by different types of operating mechanisms.

Yet another object of the present invention is the provision of a dispenser that will hold a large number of articles without damage thereto either during dispensing or while held in the dispenser.

Yet another object of the present invention is to provide a dispenser for articles of irregular shape.

Another object of the present invention is the provision of a dispenser that is mechanical in operation and relatively simple in construction while being inexpensive to manufacture.

Other objects and the nature and advantages of the instant invention will be apparent from the following description taken in conjunction with the accompanying drawings, wherein.

Figure 1:
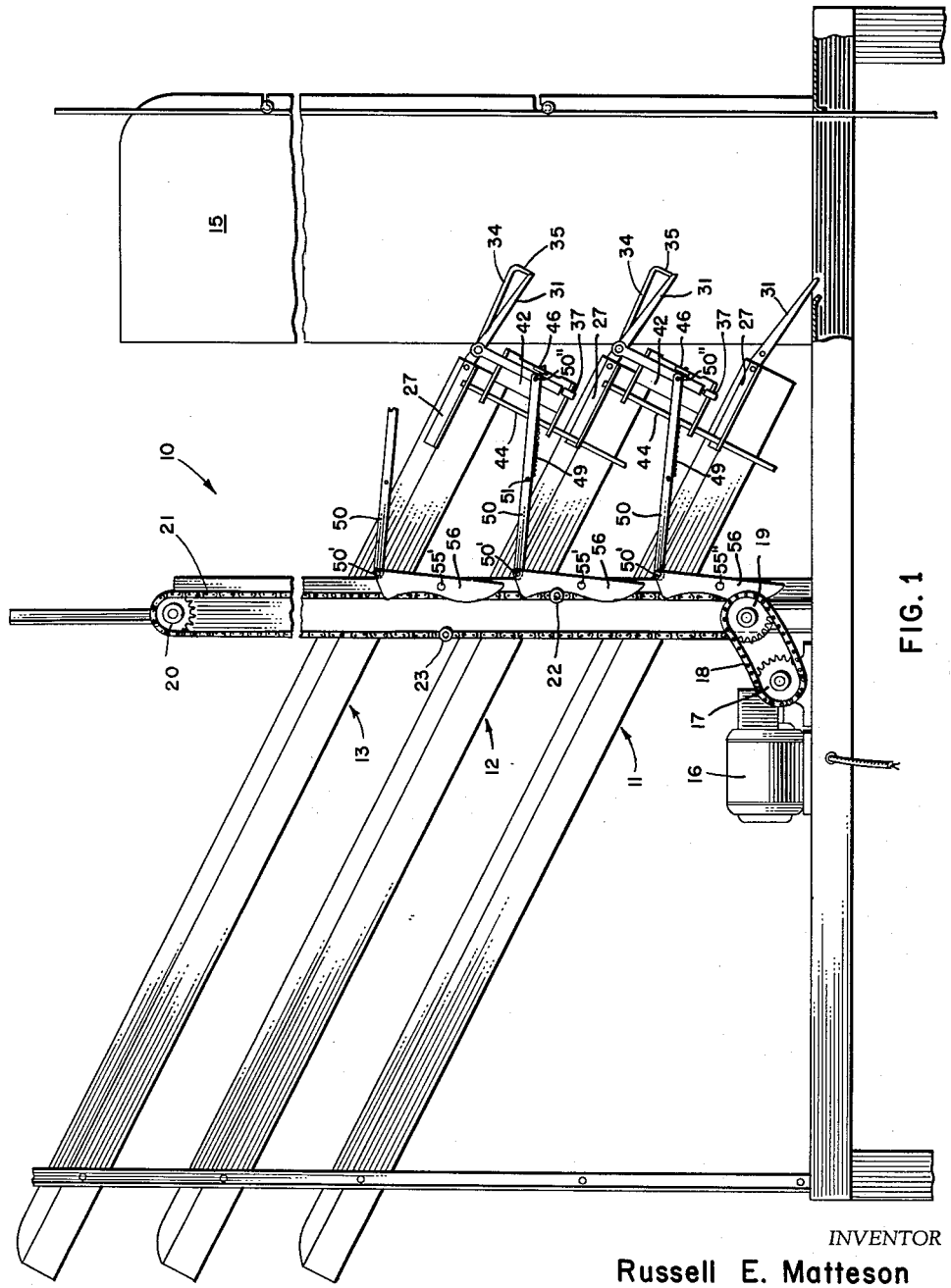
FIG. 1 is a side elevational view of a tiered chute dispenser in accordance with the present invention, with portions broken away for clarity.

Referring now to the drawings, wherein like reference numerals are used to designate like or corresponding parts throughout the several views, there is shown in FIG. 1 a tiered chute dispenser generally designated 10. Dispenser 10 comprises a plurality of inclined chutes 11, 12, 13, and it will be understood that as many chutes as may be desired may be placed on tiered array in a single dispenser 10. The chutes 11, 12, 13, etc. are each provided with a similar dispensing mechanism, to be described in detail hereinafter, and each discharges into a vertical passage generally designated 15. At the bottom of the vertical passage 15, the cartons will be received on a table, conveyor, or the like.

To operate the dispensing mechanism at the discharge end of each of the inclined chutes, there is provided an electric motor 16 which drives a sprocket 17 in conventional manner. A chain 18 is trained over the sprocket 17 and a second sprocket 19, and coaxially with the sprocket 19 is another sprocket, not shown, located behind. An operating chain 21 is trained over the sprocket behind sprocket 19, and also over a sprocket 20 that is adjacent the top of the tiered chute dispenser 10. The chain 21 has secured thereto a pair of operators 22, 23, and these operators are spaced at opposite points on the operating chain 21.

Figure 2:
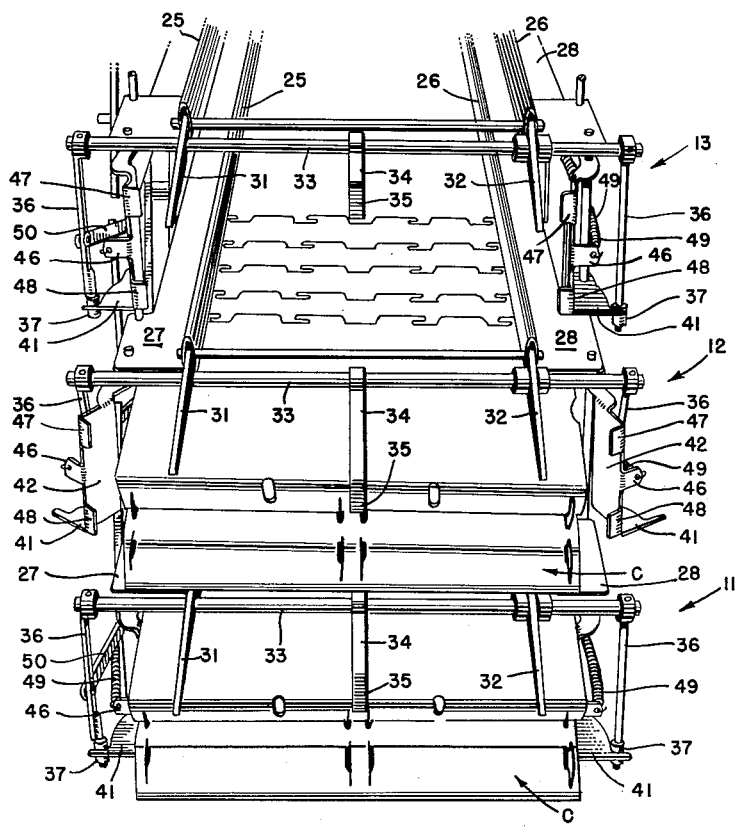
FIG. 2 is a front perspective view of the discharge end of the chute of the present invention.

Referring now to FIG. 2, there may be seen the discharge ends of the chutes 11, 12, 13. Chutes 11 and 12 are shown with egg cartons C therein of the type for which the tiered chute dispenser 10 was particularly constructed. These egg cartons are of the type shown in Patent No. 2,783,059, issued to Richard F. Reifers on February 10, 1959. Chute 13 is shown without cartons, in order to better reveal the dispensing mechanism thereof.

Each of the chutes 11, 12, 13 etc. comprises pairs of parallel hollow rails 25, 26, and these rails are supported on plates 27 and 28 respectively. Fixedly mounted in the end of hollow rails 25 is a forwardly extending guide bar 31, and a similar guide bar 32 is mounted in the end of rail 26. The guide bars 31 and 32 serve as extensions of the rail 25 and 26, and also support shafts 33 which are journaled therein. The shafts 33 form a part of the dispensing mechanism for the chute below the chute of which the guide bars 31, 32 in which it is journaled are a part. Thus, it may be seen that the shafts 33 extend across the top of the chutes, the dispensing mechanism of which they form a part. A release arm 34 is fixed on the shafts 33, and the release arms 34 extend in the general direction of the chute axis. As is best seen in FIG. 1, the release arms 34 extend beyond the discharge end of the chutes, and have a downwardly extending stop finger 35 on the outer end thereof.

Figure 3:
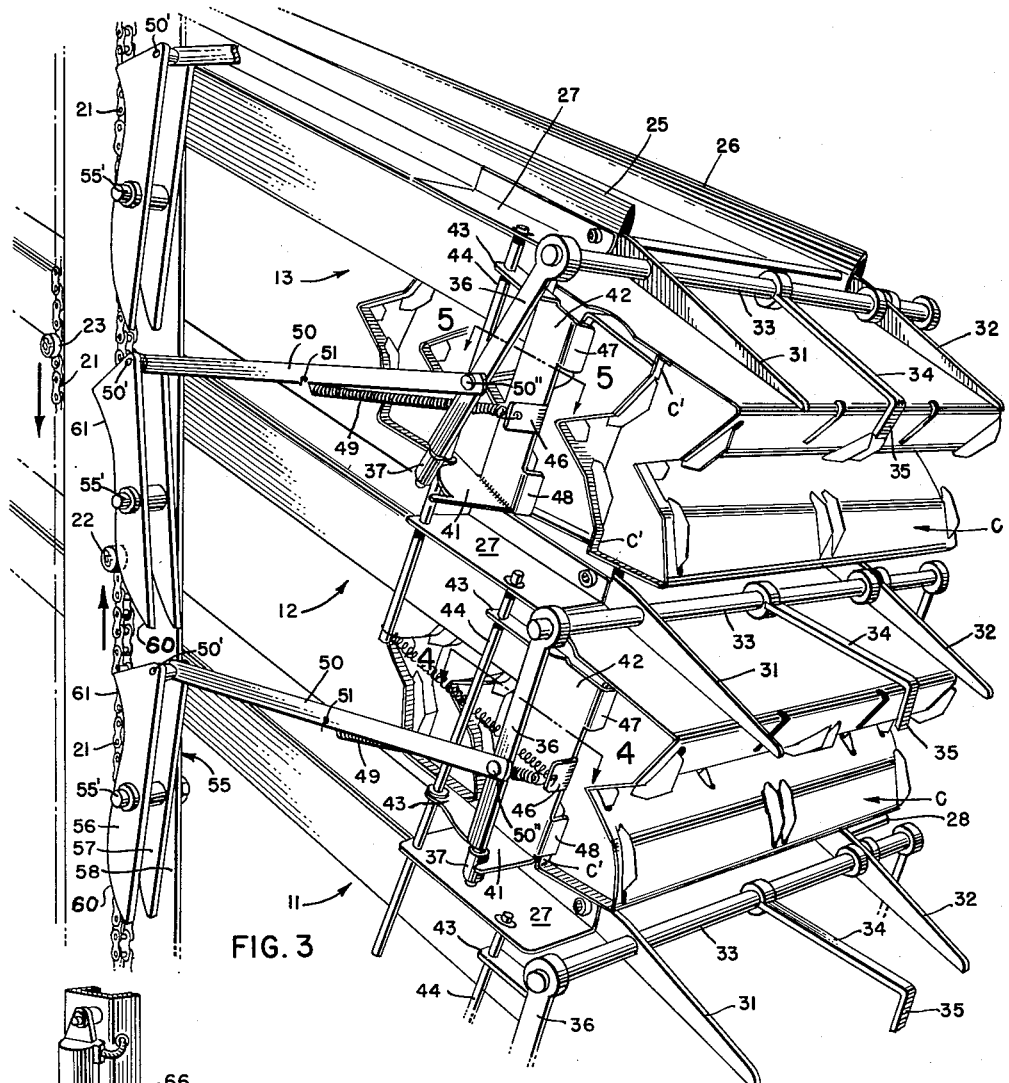
FIG. 3 is an enlarged perspective quarter view of the discharge end of the apparatus shown in FIGS. 1 and 2.

On each side of each of the chutes is a control arm 36, the upper end of which is connected to a shaft 33. As is best seen in FIG. 3, control arms 36 have a roller 37 journaled on the lower end thereof, and each roller 37 is in engagement with a cam plate 41. Each cam plate 41 is carried by, and is preferably an integral part of, a pivot plate 42. Pivot plates 42 have a pair of generally upwardly and rearwardly extending ears 43, and the ears 43 are journaled on a generally upwardly extending pivot bar 44. The pivot bars 44 are supported adjacent the discharge end of the chutes, and lie in a plane substantially perpendicular to the axis thereof. It will be noted that the pivot bar 44 of the chute 12, for example, has the upper end thereof supported in the plate 27 of chute 13 thereabove, and has the lower end extended through and beyond the plate 27 of the chute 12.

The pivot plates 42 have an outturned finger 46 on the edge thereof opposite the pivot bar 44, and also have a pair of spaced inturned fingers 47, 48 on this edge. The fingers 47 and 48 serve to engage the lowermost ones of the cartons in the chute, and the outturned finger 46 has a spring 49 connected thereto. The other end of the springs 49 are attached to a convenient point rearwardly of the discharge end of the chute, and as shown in FIG. 3 this point may be on a link 50 at 51, for example. Alternatively, the rearward end of spring 49 may be attached to the lower end of the pivot bar 44 of the chute thereabove, as shown by phantom lines in FIG. 3, for example.

As may be seen from FIG. 2, there is a pivot plate 42 provided at either side of each of the chutes, and these plates are mirror images of each other. At each side of each of the chutes there is also provided the control arms 36, and the spring 49. Thus, the parts on the two sides of each chute are substantially the same, with the exception that there is no link 50 provided on the right-hand side of the chutes as viewed in FIG. 2.

Figure 4:
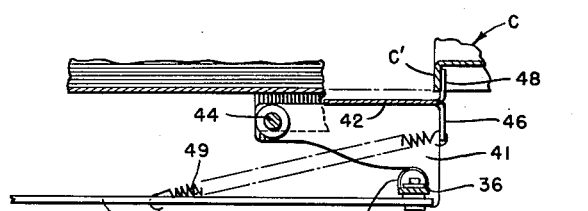
FIG. 4 is a cross-sectional view taken on the line 4—4 of FIG. 3.
Figure 5:
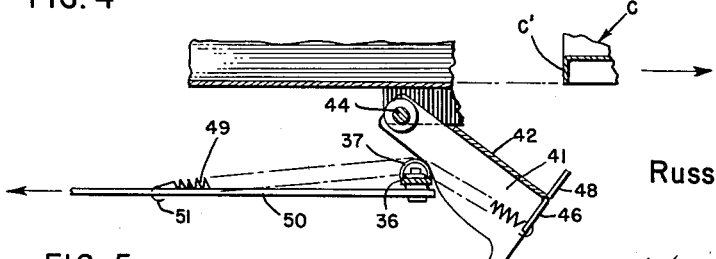
FIG. 5 is a cross-sectional view taken on the line 5—5 of FIG. 3.

Referring now to FIGS. 4 and 5, there may be seen the control arm 36 with the roller 37 thereof in engagement with the cam plate 41. There may be also seen a spring 49 attached to the outturned finger 46 and tending to rotate the plate 42 in a clockwise direction about the pivot bar 44. The inturned finger 48 is in restraining position, being engaged with a small shelf C′ that extends from the carton C. The plate 42 is held in the position shown in FIG. 4, with the inturned fingers 47, 48 thereof thus engaged, due to the engagement of roller 37 with the wide, forward part of the cam plate 41.

When the link 50 is translated to the left, to be hereinafter described, the control arm 36 is rotated on the axis of shaft 33, as will be apparent from a consideration of the two positions of the control arms 36 of the chutes 12 and 13, shown in FIG. 3, and this brings the roller 37 to the rear and narrower part of cam plate 41. Since the roller 37, and the control arm 36, to which it is attached, no longer restrain the pivot plate 42 from its outward or clockwise movement, the force of the spring 49 causes the pivot plate 42 to rotate into the position shown in FIG. 5. This releases the fingers 47, 48 from engagement with the shelves C′ of the carton C, and the carton C which is the lowermost carton in the chute is thus permitted to slide downwardly.

Referring now to FIG. 3, it will be observed that the control arm 36 of chute 12 is in the forward position thereof, and thus restrains the pivot plate 42 into the position shown in FIG. 4. Thus, the inturned fingers 47 and 48 of the pivot plate 42 of chute 12 may be seen to be in carton retaining position. Also, while the control arm 36 of chute 12 is in this forward position, the release arm 34 of the chute 12 is in an upper or release position, as shown. When the link 50 is moved to the left, the parts will assume the positions of the parts of the chute 13, and it may be seen that the control arm 36 of chute 13 is in the rearward position, thus permitting the spring 49 of chute 13 to move the pivot plate 42 outwardly so that the inturned fingers 47, 48 thereof are in the outer or carton release position. When this has been done, the cartons of the chute have slid down the chute, as have the cartons of chute 13; they are prevented from sliding completely out of the chute by the stop finger 35 on the release arm 34 of chute 13, which may be seen to be in engagement with the bottom of the bottommost carton. When the link 50 is moved to the right, the parts will revert to the position of the parts of chute 12 and at this time the stop finger 35 will be raised to a withdrawn position, thus permitting the bottommost carton to fall while the inturned fingers 47 and 48 return to the carton retaining position to engage with the carton that was the next one to the lowermost, but which is now the lowermost of the cartons.

To cause translation of the link 50 of each of the dispensing mechanisms for the several chutes, there may be seen in FIG. 3 a lever 55 made up of two similar plates 56 and 57. The plates 56 and 57 act as a unit and are pivoted at an intermediate point thereof on a bolt 55′, or the like, that is secured to the upstanding frame 58 that serves to unite the several chutes together. The link 50 is pivotally connected at 50′, at the end thereof which is remote from the discharge end of the chute, to the upper end of said lever 55; the link 50 is pivotally connected at 50″, its other end, to an intermediate part of the control arm 36. The levers 55 normally occupy the position of the lever 55 for the dispensing mechanism of the chute 12. Each of the levers 55 is provided, however, with a cam surface 60 at the lower end thereof, and when one of the operators 22, 23 on the operating chain 21 is caused to move upwardly by movement of the operating chain 21, it engages the cam surface 60 of lever 55 to cause the lever to rock to the position shown by the lever 55 that operates the mechanism of chute 13, in FIG. 3. As the chain 21 continues its travel, the operator 22 will pass upwardly along the lever 55, without disturbing it, until it engages with a second cam surface 61. The operator 22 will then cause the lever 55 to rock back to its initial position, which is the position shown for the lever 55 that operates the mechanism of chute 12.

The rocking of the levers 55 first counterclockwise and then clockwise, as viewed in FIG. 3, will cause the aforementioned translational movement of link 50, and the attendant dispensing action of the dispensing mechanism.

As will be apparent from a consideration of FIGS. 1 and 3, as the motor 16 causes the operating chain 21 to move, the operator 22, starting at the bottom of the tiered dispensers will first engage with the cam 60 of the lever 55 of lowermost chute 11. It will then engage with the other cam surface 61 of this lowermost lever 55, and will repeat this action in connection with the other levers 55 as it travels upwardly with the movement of operating chain 21. This will result in each of the dispensing mechanisms in turn, from bottom to top, operating to dispense into the vertical passageway 15 the lowermost or bottommost carton in that particular chute. Thus, a carton will be dropped into the vertical passageway 15 from each of the chutes 11, 12, 13, etc. and as these cartons are differently printed, the table or conveyor at the bottom of the vertical passage 15 will be supplied with one of each of the various printed cartons. When the operator 22 has reached the top, the operator 23 will be at the bottom of its path of travel, and upon further operation of motor 16 the operator 23 will engage with the various cam surfaces of the successive levers. The cycling can be repeated at will by control of the supply of energy to motor 16, as will be understood.

Figure 6:
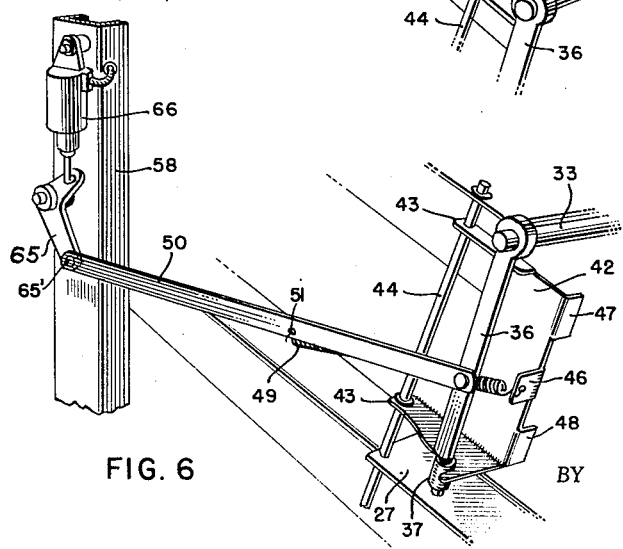
FIG. 6 is a fragmentary perspective view illustrating another embodiment of the invention.

To operate the various dispensing mechanisms with a different operating mechanism, the structure shown in FIG. 6 may be provided, wherein there may be seen the link 50 having its end remote from the control arm 36 connected at 65′ to one end of a bell crank lever 65. The bell crank lever 65 is journaled on the member 58 and has the other end thereof engaged by the armature of a solenoid 66. As will be understood, there may be a solenoid for each of the links 50, and the several solenoids 66 may be suitably connected to a control panel so that the dispensing mechanism associated with any one of the chutes 11, 12, etc. may be operated to dispense a carton or cartons from that chute.

The tiered chute dispenser of the present invention may be seen to be constructed of readily available material, such as sheet metal and steel rods and bars. The tiered chute dispenser of the present invention occupies relatively little space and holds a large number of egg cartons that have been differently printed, so that they are not harmed during the storage thereof in the chutes. The dispensing mechanisms operate without damage to the egg carton, which may be seen to be noncircular and to be relatively flexible and crushable due to the manufacture thereof from paperboard. Because the link 50 serves as the complete control member for both of the control arms 36, the dispensing mechanism herein disclosed may be readily operated by various types of operating mechanisms. Further, the operating mechanisms may provide for individual or cyclical control.

It will be obvious to those skilled in the art that various changes may be made without departing from the spirit of the invention and therefore the invention is not limited to what is shown in the drawings and described in the specification but only as indicated in the appended claims.

What is claimed is:

1. In a tiered chute dispenser for dispensing cartons or the like, at least one inclined chute, a generally upwardly extending pivot bar mounted on either side of said chute adjacent the discharge end in a plane substantially perpendicular to the longitudinal axis thereof, a pivot plate mounted on each of said bars extending generally longitudinally of said chute toward said discharge end, said plates each having on their edge opposite said pivot bars an outturned finger and inturned fingers, and a cam plate extending outwardly from the lower edges of said plates, a spring connected to each of said outturned fingers and anchored to a part on said chute rearwardly of said discharge end, a shaft journaled across the top of said chute adjacent the discharge end thereof and having a release arm secured thereto extending in the general direction of the chute axis beyond the discharge end thereof and beyond said inturned fingers, a downwardly extending stop finger on said release arm, a control arm on each side of said chute each having the upper end thereof connected to said shaft and a roller on the lower end thereof in juxtaposition with said cam plate to hold each pivot plate in a carton restraining position in the forward position thereof, said stop finger being normally in a carton release position, a link pivotally connected to an intermediate part of a said control arm and extending generally away from the discharge end of said chute, a lever pivoted at an intermediate point thereof about an axis extending transversely of said chute and pivotally connected to said link, and means for intermittently rocking said lever, said lever including at least one cam surface on said lever above and below the pivot axis thereof, a chain movable adjacent said lever, and an operator on said chain successively engageable with said lever cam surfaces.

2. In a tiered chute dispenser for dispensing cartons or the like, at least one inclined chute, a generally upwardly extending pivot bar mounted on either side of said chute adjacent the discharge end in a plane substantially perpendicular to the longitudinal axis thereof, a pivot plate mounted on each of said bars extending generally longitudinally of said chute toward said discharge end, said plates each having on their edge opposite said pivot bars an outturned finger and inturned fingers, and a cam plate extending outwardly from the lower edges of said plates, a spring connected to each of said outturned fingers and anchored to a part on said chute rearwardly of said discharge end, a shaft journaled across the top of said chute adjacent the discharge end thereof and having a release arm secured thereto extending in the general direction of the chute axis beyond the discharge end thereof and beyond said inturned fingers, a downwardly extending stop finger on said release arm, a control arm on each side of said chute each having the upper end thereof connected to said shaft and a roller on the lower end thereof in juxtaposition with said cam plate to hold each pivot plate in a carton restraining position in the forward position thereof, said stop finger being normally in a carton release position, and force transmitting means operatively connected to said control arm for sequentially operating said release arm and pivot plates.

3. The apparatus of claim 2, said force transmitting means including solenoid means connected to one of said control arms for rocking said control arm.

4. In a tiered chute dispenser for dispensing cartons or the like, at least one inclined chute, a generally upwardly extending pivot bar mounted on either side of said chute adjacent the discharge end in a plane substantially perpendicular to the longitudinal axis thereof, a pivot plate mounted on each of said bars extending generally longitudinally of said chute toward said discharge end, said plates each having on their edge opposite said pivot bars an inturned finger, and a cam plate extending outwardly from the lower edges of said plates, biasing means connected to each of said plates and normally urging said plates away from said chute toward a carton release position, a shaft journaled across the top of said chute adjacent the discharge end thereof and having a release arm secured thereto extending in the general direction of the chute axis beyond the discharge end thereof and beyond said inturned fingers, a downwardly extending stop finger on said release arm, a control arm on each side of said chute each having the upper end thereof connected to said shaft, a roller on the lower end thereof in juxtaposition with said cam plate and normally retaining each pivot plate adjacent said chute in a carton restraining position against the force of said biasing means, said stop finger being normally in a carton release position, a link pivotally connected to an intermediate part of a said control arm and extending generally away from the discharge end of said chute, a lever pivoted at an intermediate point thereof about an axis extending transversely of said chute and pivotally connected to said link, and means for rocking said lever including a pair of cam surfaces above and below the pivot axis of said lever, and operating means including an operator successively engageable with said lever cam surfaces for sequentially operating said control arm for permitting said plates to move away from said chute and simultaneously moving said stop finger into a carton retaining position with respect to said chute.

5. In a tiered chute dispenser for dispensing cartons or the like, at least one inclined chute, a pair of plates pivotally mounted one on either side of said chute adjacent the discharge end thereof for movement about parallel axes in a plane substantially perpendicular to the longitudinal chute axis and extending generally transversely of said chute, said plates each having on their edge nearest the chute discharge end inturned fingers, and a cam plate extending outwardly from the lower edge of each said plate, biasing means connected to each of said plates and normally biasing said plates toward said chute with the inturned fingers disposed in a carton retaining position at the discharge end of said chute, a shaft journaled across the top of said chute adjacent the discharge end thereof and having a release arm secured thereto extending in the general direction of the longitudinal chute axis beyond the discharge end thereof and beyond said inturned fingers, a downwardly extending stop finger on said release arm, a control arm on each side of said chute, each control arm having the upper end thereof connected to said shaft and a roller on the lower end thereof in juxtaposition with said cam plate to hold each of said plates in a carton retaining position against the pressure of said biasing means, said stop finger being normally in a carton release position, a link pivotally connected to an intermediate part of a said control arm and extending generally away from the discharge end of said chute, and power operated means operatively connected to said link for moving the same in a general direction of said longitudinal chute axis and sequentially operating said plates and stop finger.

6. In a tiered chute dispenser for dispensing cartons or the like, at least one inclined chute, a pair of fingers pivotally mounted one on either side of said chute adjacent the discharge end thereof for movement about parallel axes in a plane substantially perpendicular to the longitudinal chute axis and extending generally longitudinally of said chute and across the discharge end thereof, cam means operatively connected with each said finger, biasing means acting on each of said fingers urging said fingers away from said chute toward a carton release position, a shaft journaled across the top of said chute adjacent the discharge end thereof and having a release arm secured thereto extending in the general direction of the longitudinal chute axis beyond the discharge end thereof and beyond said fingers, a downwardly extending stop finger on said release arm, a control arm on each side of said chute each having the upper end thereof connected to said shaft and having the lower end thereof in juxtaposition with one of said cam means and holding said pair of fingers in a carton restraining position against the pressure of said biasing means, said stop finger normally being in a carton release position, a link pivotally connected to an intermediate part of one of said control arms and extending generally away from the discharge end of said chute, and means for periodically reciprocating said link and oscillating said one control arm for sequentially permitting said fingers to move away from said chute subject to the force of said biasing means and permitting said stop finger to move from a carton release position to a carton retaining position.

7. A dispenser for dispensing cartons or the like including at least one inclined chute and mechanism for controlling release of individual cartons, said mechanism comprising laterally pivotal finger means mounted on opposite sides of said chute adjacent the discharge end thereof on an axis of rotation substantially perpendicular to the longitudinal axis of said chute, said finger means including portions projecting into the discharge end of said chute, lateral cam means on each said finger means and extending along the longitudinal axis of said chute, spring means connected to each of said finger means normally urging said finger means about its perpendicular axis of rotation in the plane of said cam means, away from the discharge end of said chute to a carton release position, vertical pivotal stop means on an axis of rotation overlying said chute and including a stop portion depending into said chute discharge end forwardly of said finger means, control means engaged with said cam means and normally retaining said finger means portions in a carton retaining position against the pressure of said spring means and movable simultaneously with said stop means for simultaneously permitting said finger means to move laterally with respect to said chute from a carton retaining to a carton releasing position, and at the same time causing said stop means to oscillate vertically between a carton release to a carton retaining position, and force transmitting means connected to said control means adapted to operate said finger and stop means.

8. The apparatus of claim 7; said force transmitting means including a cam lever pivoted at an intermediate portion, a link pivotally connected to said cam lever and said control means, and means to rock said cam lever including a pair of cam surfaces on each said lever above and below the pivot axis of said cam lever, a driven member including an operator engageable on the cam surfaces of said cam lever successively.

9. The apparatus of claim 7; said force transmitting means including a link pivotally connected to said control means, and a power unit operatively connected to said link.

10. A dispenser for cartons or the like comprising, at least one inclined chute, at least one pivot bar disposed in a plane substantially perpendicular to the longitudinal axis of said chute, a laterally pivotal plate journalled on said bar and including finger portions extending inwardly into said chute, cam means extending laterally from said pivot plate along the longitudinal chute axis, spring means connected to said plate and normally urging it away from said chute in the general plane of said cam means, a support shaft extending across the chute at the discharge end thereof and including a release arm including a stop finger portion depending into said chute forwardly of said finger portions of said laterally pivotal plate, a vertically pivotal control arm connected to said shaft and including cam follower means engaged on said cam means of said pivot plate to retain said pivot plate finger portions in said chute against the force of said spring means, and power means connected to said control arm for oscillating the control arm and shaft simultaneously and causing said stop finger portion to move into a carton retaining position with respect to said chute and at the same time permitting said spring means to move the pivot plate and finger portions thereof laterally away from said chute into a carton release position.

References Cited in the file of this patent

UNITED STATES PATENTS

| | | |
|---|---|---|
| 1,633,675 | Oliver | June 28, 1927 |
| 1,711,021 | Hoopes | Apr. 30, 1929 |
| 1,830,805 | Myer | Nov. 10, 1931 |
| 1,910,367 | Schauweker | May 23, 1933 |
| 2,100,423 | Zeigler | Nov. 30, 1937 |
| 2,604,577 | Strickland, et al. | July 22, 1956 |